United States Patent [19]

Suzuki

[11] Patent Number: 5,280,499

[45] Date of Patent: Jan. 18, 1994

[54] SPREAD SPECTRUM COMMUNICATION SYSTEM

[75] Inventor: Masamitsu Suzuki, Yokohama, Japan

[73] Assignee: Ricoh Company, Ltd., Tokyo, Japan

[21] Appl. No.: 962,348

[22] Filed: Oct. 16, 1992

[30] Foreign Application Priority Data

| Oct. 18, 1991 | [JP] | Japan | 3-299784 |
| Jan. 13, 1992 | [JP] | Japan | 4-23214 |
| Sep. 11, 1992 | [JP] | Japan | 4-269597 |

[51] Int. Cl.$^5$ .................................................. H04L 27/26
[52] U.S. Cl. ........................................................... 375/1
[58] Field of Search ............................................. 375/1

[56] References Cited

U.S. PATENT DOCUMENTS

| 4,639,932 | 1/1987 | Schiff | 375/1 |
| 5,121,407 | 6/1992 | Partyka et al. | 375/1 |
| 5,128,957 | 7/1992 | Nakagawa | 375/1 |
| 5,140,610 | 8/1992 | Holliday et al. | 375/1 |
| 5,150,377 | 9/1992 | Vannucci | 375/1 |

OTHER PUBLICATIONS

"Spread Spectrum Systems" by R. C. Dixon, John Wiley & Sons, 1976, pp. 116-117.

Primary Examiner—Gilberto Barrón, Jr.
Attorney, Agent, or Firm—Oblon, Spivak, McClelland, Maier & Neustadt

[57] ABSTRACT

A spread spectrum communication system includes a transmitter having: a data generator for generating a data signal; a pn generator for generating a first pn signal in accordance with a pn code clock; a modulator for modulating the pn code clock by synchronizing the data signal with a multiple N of one period of the first pn signal; a first part for detecting one period of the first pn signal; a second part for outputting a clock to the data generator in accordance with a converted period equal to a multiple N of the detected period; and an output part for transmitting a signal at an output of the pn generator, and a receiver which receives the transmitted signal, the receiver having: a second pn generator for generating a second pn signal in synchronism with the transmitted signal; a demodulator for demodulating the transmitted signal with the second pn signal; a third part for detecting one period of the second pn signal; a fourth part for outputting a timing signal in accordance with a converted period equal to a multiple N of the detected period; and a discriminator for detecting each bit of a demodulated signal in synchronism with the timing signal.

12 Claims, 19 Drawing Sheets

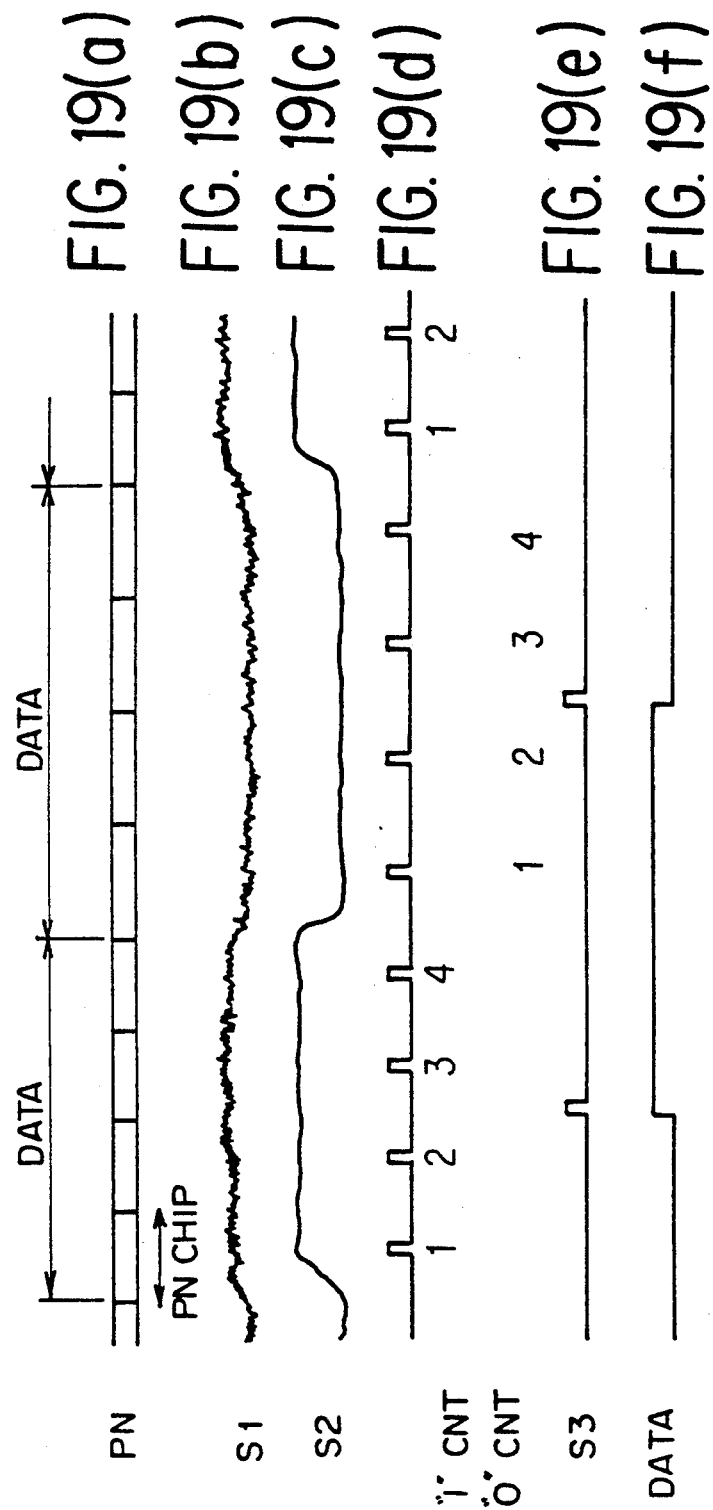

SPREAD SPECTRUM COMMUNICATION SYSTEM

BACKGROUND OF THE INVENTION

The present invention generally relates to a spread spectrum communication system, and more particularly to a spread spectrum communication system in which spread spectrum modulation is used to modulate a clock used to generate a pseudo noise code sequence. The spread spectrum communication system is applicable to wireless communications including indoor radio communications and mobile communications.

There have been proposed some types of spread spectrum (SS) communication systems as a data transmission system enabling increased immunity to noise, increased resistance to interference and security of transmitted information. Among the SS communication systems, there are a direct sequence (DS/SS) communication system and a frequency hopping (FH/SS) communication system. In the DS/SS communication, a signal modulated with information is multiplied with a pseudo noise (pn) code sequence which is generated by a pn code generator. In the FH/SS communication, a carrier frequency of the modulated signal is shifted in accordance with a prescribed pattern.

Among the SS communication systems, there is also another type of SS communication system which is more simple and more feasible than the above mentioned systems. This SS communication system utilizes clock rate modulation (CRM) for data transmission, which is disclosed in "Spread Spectrum Systems" by R. C. Dixon, John Wiley & Sons, 1976, pp. 116-117. In this CRM/SS communication, a clock input to the pn code generator is frequency-modulated in accordance with a digital data signal.

When a digital signal produced through the CRM/SS is transmitted at a transmitter of the CRM/SS system mentioned above, a pn code clock used to generate the pn code sequence is subjected to frequency shift keying (FSK) to modulate the frequency of the pn code clock with the data signal. When the transmitted signal is received at a receiver, a delay locked loop (DLL) of the receiver performs a pn signal synchronization and feedback control so as to generate a second pn code sequence synchronuously with the transmitted signal. Then, at the receiver, a demodulated signal is produced from a small control signal of a voltage controlled oscillator (OSC) of the DLL. Because this control signal is very small, amplification of the control signal and noise reduction therefrom are performed at a waveform shaper of the receiver, and a bit timing of the demodulation is taken from the amplified signal by using a phase locked loop (PLL) or the like so that data corresponding to the digital data signal is reproduced from the transmitted signal.

However, in the above mentioned CRM/SS system, it is necessary to use an expensive, somewhat complicated PLL circuit in order to accomplish the bit timing synchronization. Also, there is a problem in that fluctuations of the phase or level of the demodulated signal may occur due to noises, power changes and temperature changes at the waveform shaper and the DLL, thereby producing errors of the demodulation. Therefore, when the above mentioned CRM/SS system is used, it is difficult to accurately demodulate the transmitted signal so as to reproduce the corresponding digital data.

SUMMARY OF THE INVENTION

Accordingly, it is a general object of the present invention to provide an improved spread spectrum communication system in which the above described problems are eliminated.

Another, more specific object of the present invention is to provide a spread spectrum communication system in which the demodulation of the frequency-modulated signal can be reliably accomplished by synchronizing the pn code signal with the transmitted signal so as to reproduce data corresponding to the digital data signal with no considerable demodulation errors. Still another object of the present invention is to provide a spread spectrum communication system which is simple and feasible with no PLL circuit being used for bit timing synchronization. The above mentioned objects of the present invention are achieved by a spread spectrum communication system which includes a transmitter including: a data generator for generating a data signal to be transmitted; a pn generator for generating a first pn code sequence in accordance with a pn code clock; a modulation part for modulating the pn code clock in accordance with the data signal by synchronizing the data signal with a multiple N of one period of the first pn code sequence; a first part for detecting one period of the first pn code sequence generated by the pn generator; a second part for converting the detected period of the first pn code sequence into a period equal to a multiple N of the detected period and for outputting a clock with the N period to the data generator; and an output part for transmitting a signal produced at an output of the pn generator, and a receiver which receives the transmitted signal from the transmitter, the receiver including: a second pn generator for generating a second pn code sequence in synchronism with the transmitted signal; a demodulation part for demodulating the transmitted signal with the second pn code sequence generated by the second pn generator so as to reproduce data corresponding to the data signal; a third part for detecting one period of the second pn code sequence; a fourth part for converting the detected period of the second pn code sequence into a period equal to a multiple N of the detected period and for outputting a timing signal in accordance with the N period; and a discrimination part for detecting whether each bit of a demodulated signal at an output of the demodulation part is equal to a high value "1" or a low value "0" in synchronism with the timing signal of the fourth part. According to the spread spectrum communication system of the present invention, it is possible to accurately and reliably demodulate the frequency-modulated signal by eliminating the synchronizing errors and demodulating errors due to the fluctuations of the demodulated signal. Also, the bit timing synchronization can be accomplished at the receiver of the SS communication system with no PLL circuit being used.

Other objects and further features of the present invention will become apparent from the following detailed description when read in conjunction with the accompanying drawings.

BRIEF DESCRIPTION OF THE DRAWINGS

FIG. 9(a) through (f) is a diagram for explaining a set of signals produced at some parts of each of the receivers shown in FIGS. 17 and 18.

DESCRIPTION OF THE PREFERRED EMBODIMENTS

Figure 1:
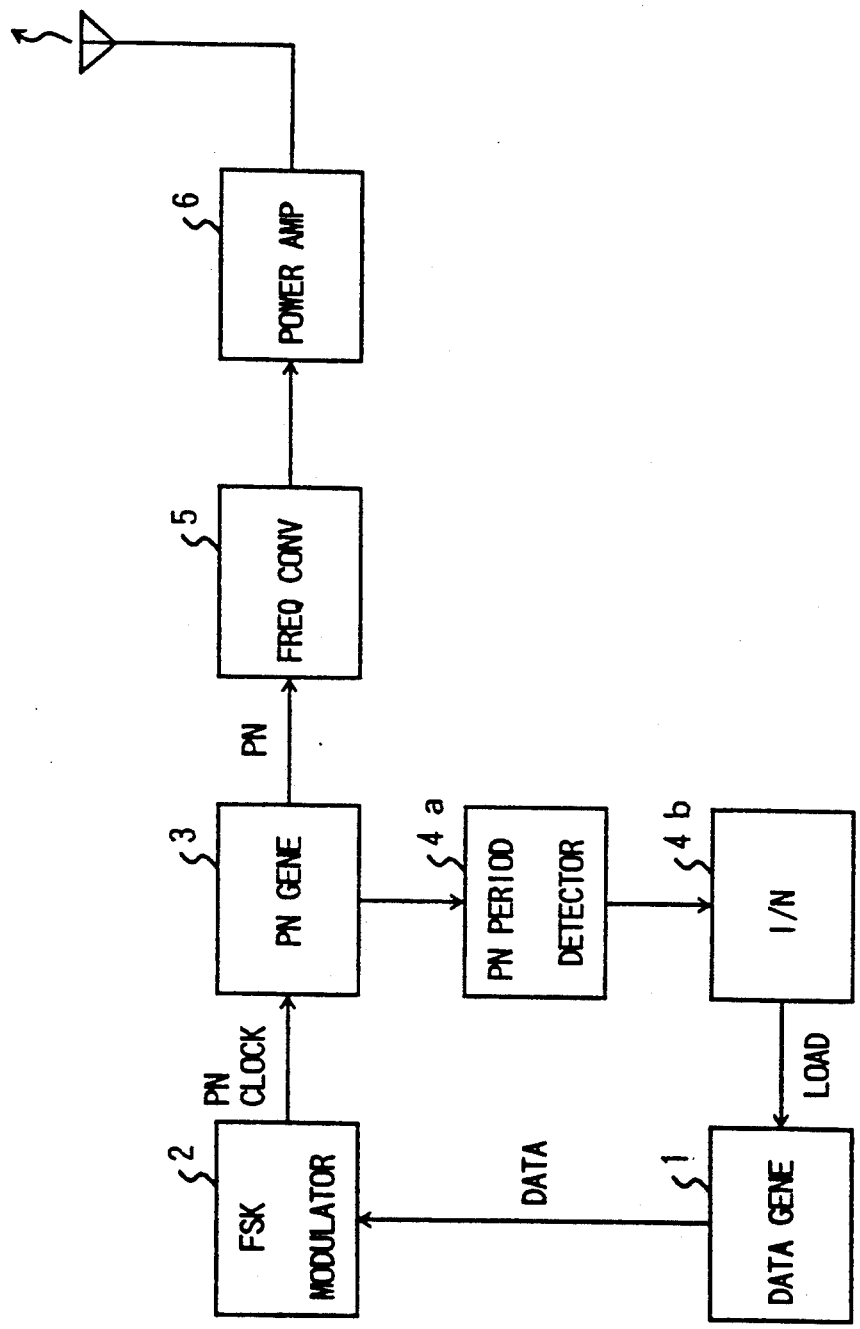
FIG. 1 is a block diagram showing a transmitter of a spread spectrum (SS) communication system according to the present invention.

A description will be given of a transmitter embodiment of a spread spectrum (SS) communication system of the present invention, with reference to FIG. 1. In the transmitter shown in FIG. 1, a data generator 1, a frequency shift keying (FSK) modulator 2, a pn code generator 3, a pn period detector 4a, a 1/N divider 4b, a frequency converter 5, and a power amplifier 6 are connected as shown in FIG. 1.

The data generator 1, which is clocked by a signal (or data clock signal) of the 1/N divider 4b, provides an input of the FSK modulator 2 with a data signal indicating the information to be transmitted. At the FSK modulator 2, a pn code clock is subjected to the frequency shift keying in accordance with the data signal of the data generator 1, and this pn code clock is supplied to the pn code generator 3. The pn code generator 3 is clocked by the pn code clock of the FSK modulator 2, the frequency of this pn code clock being modulated (FSK) in accordance with the data signal. The pn code generator 3 then produces a pn code sequence whose clock is frequency modulated in accordance with the data signal from the data generator 1. The pn code signal of the pn code generator 3 is processed by the frequency converter 5 to a baseband signal The carrier signal combined with the pn code signal, output by the frequency converter 5, is amplified at the power amplifier 6, and the amplified signal is transmitted via an antenna as a transmit signal of the transmitter.

On the other hand, the pn period detector 4a detects a start of one period of the pn code signal generated by the pn code generator 3, and outputs a period signal indicating one period of the pn code signal to the 1/N divider 4b. At the 1/N divider 4b, the period signal is converted to an N period signal having a period equal to a multiple N of one period of the pn code signal. This N period signal is supplied by the 1/N divider 4b to the data generator 1 as the data clock input to the data generator 1. Thus, the data signal transmitted from the transmitter is synchronized with a multiple N of one period of the pn code signal output by the pn code generator 3.

Figure 2:
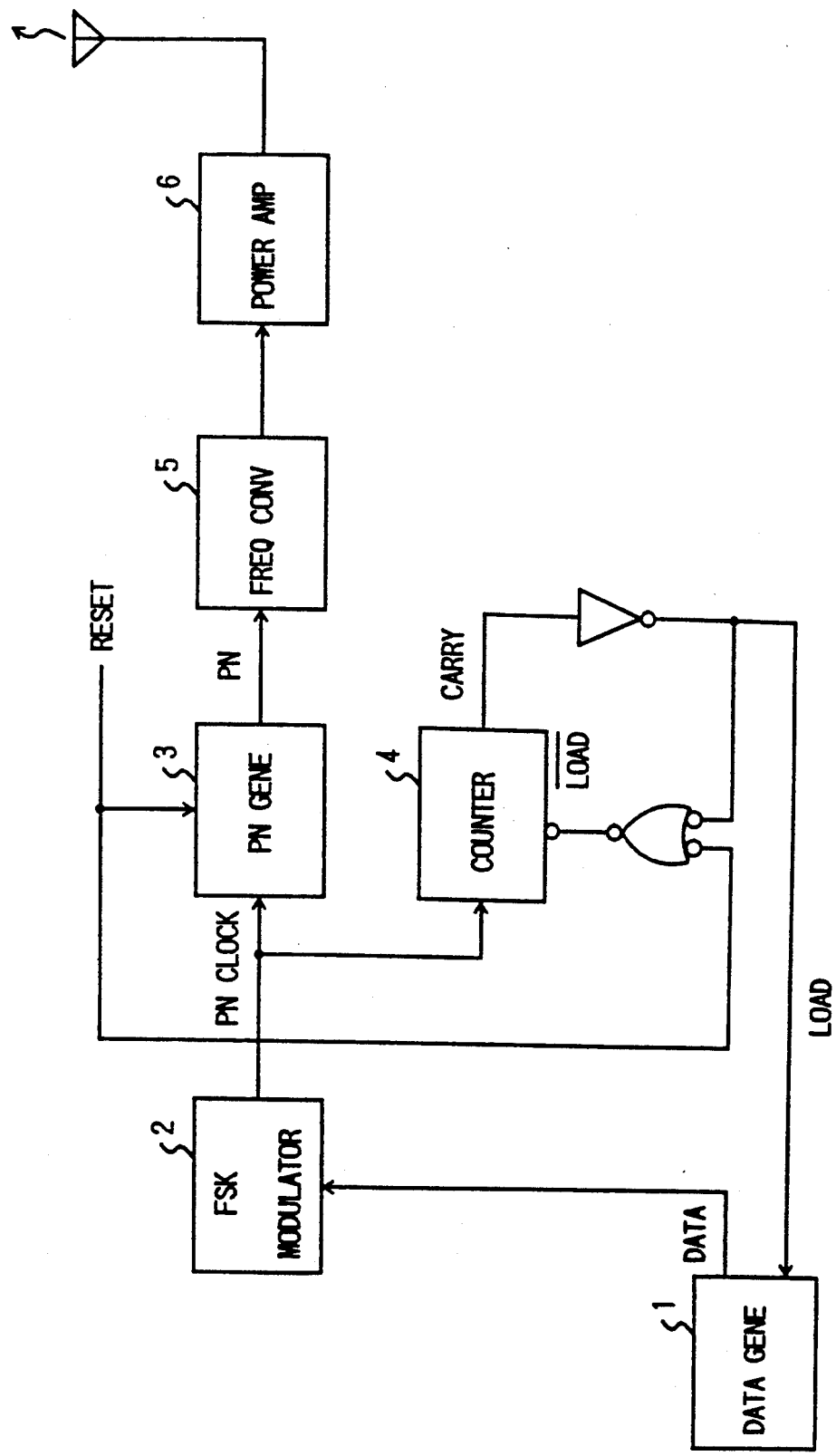
FIG. 2 is a block diagram showing a variation of the transmitter shown in FIG. 1.

FIG. 2 shows a variation of the transmitter shown in FIG. 1 according to the present invention. In FIG. 2, the parts which are the same as corresponding parts shown in FIG. 1 are designated by the same reference numerals, and a description thereof will be omitted. In the transmitter shown in FIG. 2, a counter 4 is used in lieu of the detector 4a and the divider 4b shown in FIG. 1.

In the transmitter shown in FIG. 2, a reset signal is input to the pn code generator 3 so as to start generating a sequence of pn codes before the transmission is performed. This reset signal is also input to the counter 4 so that the counter 4 starts counting the bits of the pn code signal corresponding to one period of the data signal. The pn code generator 3 is clocked by the pn code clock of the FSK modulator 2, the frequency of which is modulated in accordance with the data signal of the data generator 1. Thus, the pn code generator 3 repeatedly outputs the pn code sequence having a period L corresponding to one period of the pn code sequence. The pn code signal is synchronized with the frequency-modulated pn code clock of the FSK modulator 2. The counter 4 is so constructed that the counter 4 outputs a carry signal each time it counts D (=LN) bits of the pn code signal corresponding to one period of the data signal, and that an inverted signal amplitude of the carry signal produced at the counter 4 is used as the data clock signal input to the data generator 1. The data clock signal is supplied to the data generator 1 each time D bits of the pn code signal are counted by the counter 4.

The data generator 1, which is clocked by the output signal of the counter 4, outputs the data signal to the FSK modulator 2 in synchronism with the signal of the counter 4. The FSK modulator 2 performs the frequency shift keying of the pn code clock in accordance with the data signal of the data generator 1. Thus, the FSK modulator 2 outputs the pn code clock to the pn code generator 3 so as to generate the pn code signal, the frequency of the pn clock signal being modulated in accordance with the data signal of the data generator 1 which is synchronized with one period of the pn code signal generated by the pn code generator 3. The output signal of the frequency converter 5 is a baseband signal whose frequency is converted into a frequency of the carrier signal. The carrier signal combined with the pn code signal, output by the frequency converter 5, is amplified at the power amplifier 6, and the amplified signal is transmitted via an antenna as the transmit signal of the transmitter.

FIG. 3(a) through (e) show a set of signals produced in the transmitter shown in FIG. 2 as described above.

Figure 3:
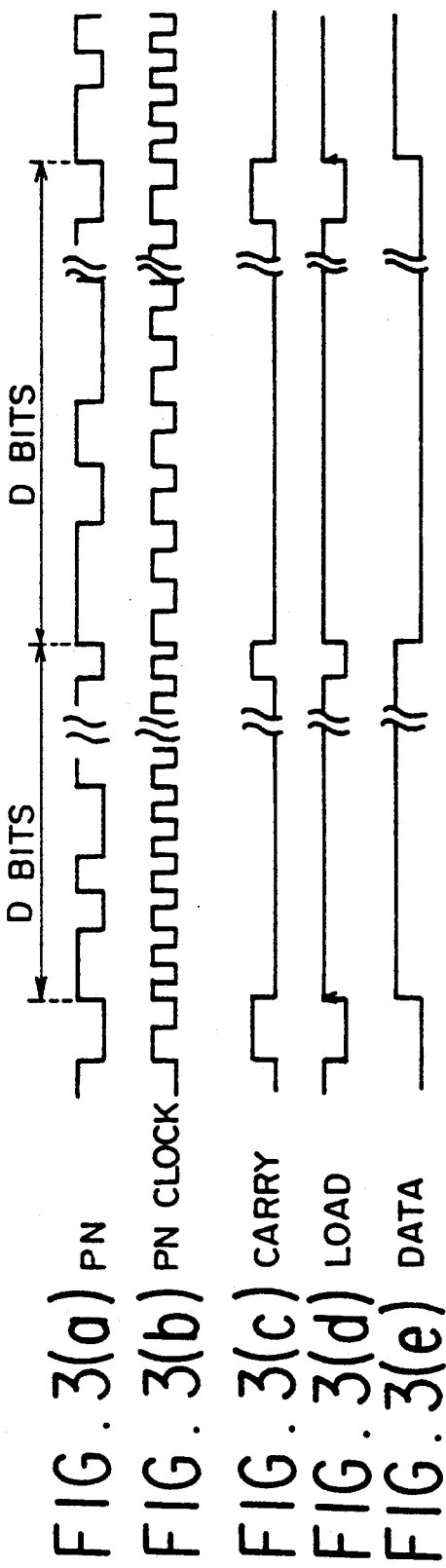
FIG. 3(a) through (e) is a diagram for explaining a set of signals produced at some parts of the transmitter shown in FIG. 2.

FIG. 3(a) shows the pn code signal produced at the output of the pn code generator 3. FIG. 3(b) shows the pn code clock produced at the input of the pn code generator 3. FIG. 3(c) and (d) counter 4. FIG. 3(e) shows the data signal produced at the output of the data generator 1.

Figure 4:
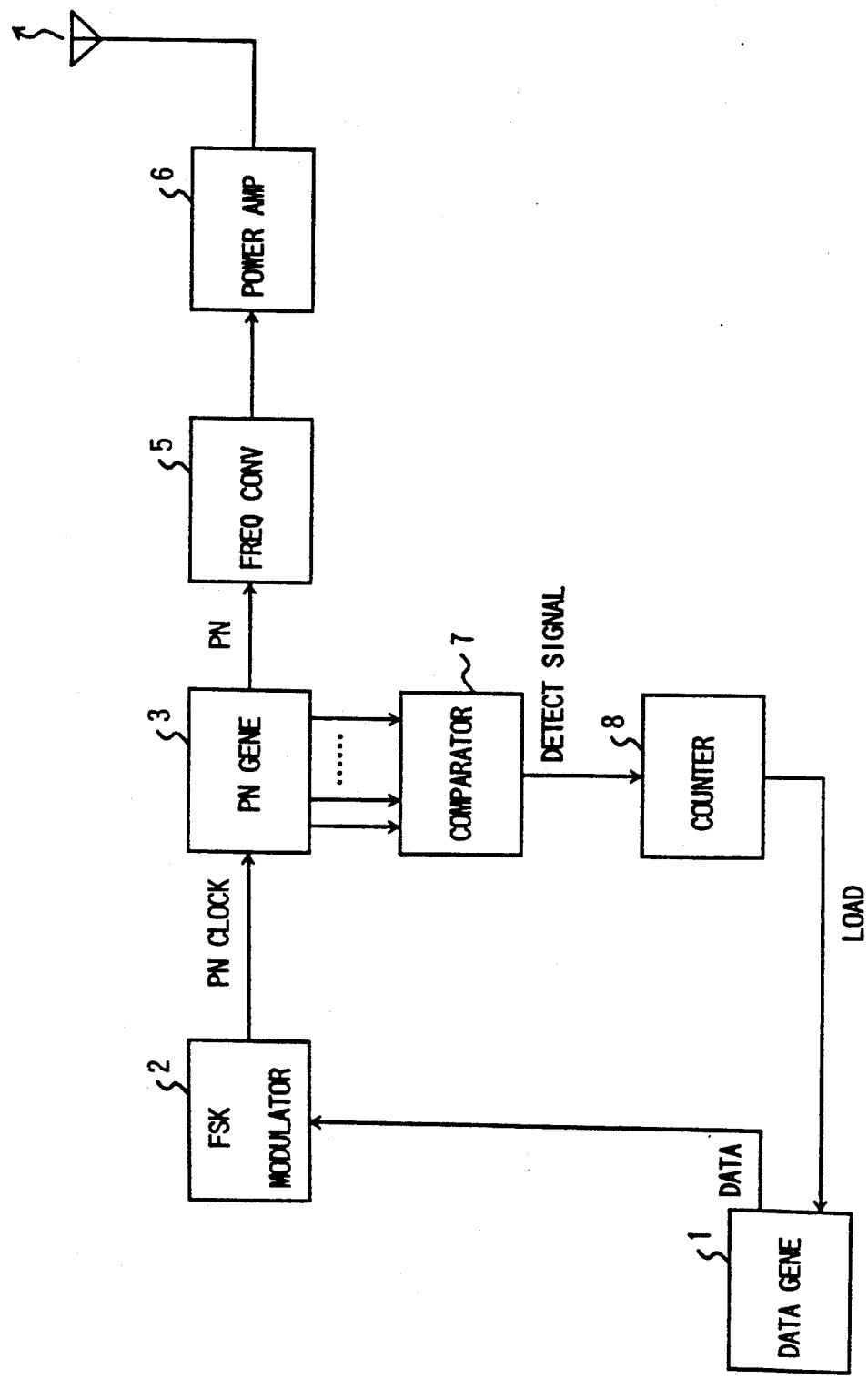
FIG. 4 is a block diagram showing another variation of the transmitter shown in FIG. 1.

FIG. 4 shows another variation of the transmitter shown in FIG. 1 according to the present invention. In FIG. 4, the parts which are the same as corresponding parts shown in FIG. 1 are designated by the same reference numerals, and a description thereof will be omitted. In the transmitter shown in FIG. 4, a comparator 7 and a counter 8 are provided in lieu of the detector 4a and the divider 4b shown in FIG. 1.

At the pn code generator 3 of the transmitter shown in FIG. 4, an M sequence (maximal-length linear shift register sequence) is used as the pn code sequence. The pn code generator 3 includes a shift register for generating a plurality of bits of the M sequence used as the pn code sequence. At the comparator 7, the bits of the shift register and prescribed reference values of the comparator 7 are compared, and a detect signal indicating one period of the pn code sequence is supplied to the counter 8. When a number "N" of receptions of the detect signal from the comparator 7 is counted at the counter 8, the data clock signal is output to the data generator 1. In accordance with the signal of the counter 4, the data generator 1 generates the data signal to the FSK modulator 2. Then, the FSK modulator 2 outputs the pn code clock to the pn code generator 3, the pn code signal produced at the pn code generator in accordance with the pn code clock. The frequency of the pn code clock is modulated in accordance with the data signal of the data generator 1 having a period "D" (or "D" bits) which data signal is synchronized with a multiple "N" of one period "L" of the pn code signal generated by the pn code generator 3 (D=LN). If one period of the pn code signal output by the pn code generator 3 is equal to one period of the data signal (N=1), no counter 8 is needed in the transmitter shown in FIG. 4.

Next, a description will be given of a receiver embodiment of the SS communication system according to the present invention, with reference to FIG. 5. In this receiver shown in FIG. 5, an RF amplifier 11, a frequency converter 12, a correlator 13, a pn code generator 14, a pn period detector 14a, a 1/N divider 14b, a loop filter 15, a voltage-controlled oscillator (VCO) 16, a waveform shaper 17, and a discriminator 18 are connected in a manner as shown in FIG. 5.

Figure 5:
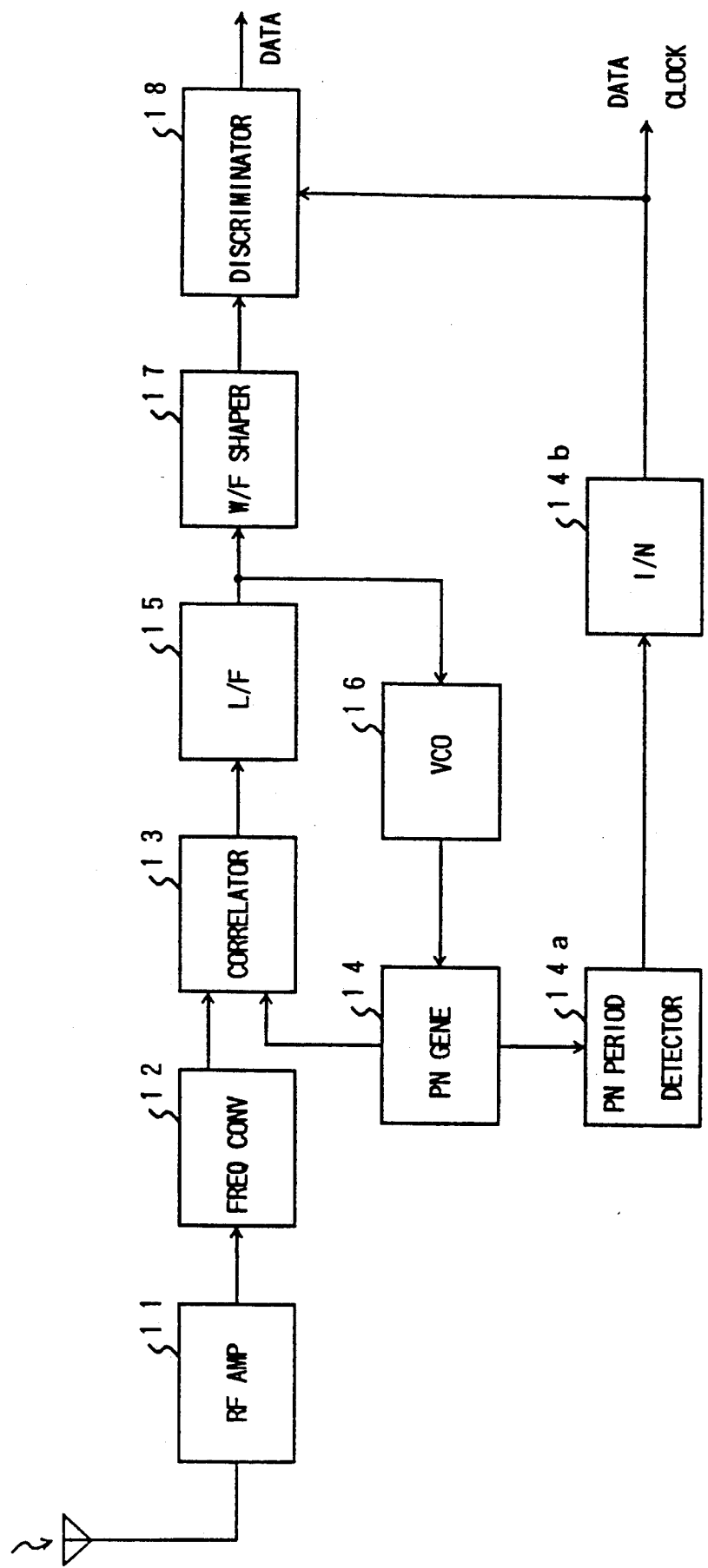
FIG. 5 is a block diagram showing a receiver of the SS communication system according to the present invention.

In the receiver shown in FIG. 5, the transmit signal of the above described transmitter is received via an antenna, and this received signal is input to the RF amplifier 11. The transmit signal is amplified at the RF amplifier 11. The amplified transmit signal having a radio frequency is converted into an intermediate frequency (IF) signal at the frequency converter 12. The IF signal of the frequency converter 12 is then supplied to a delay locked loop (DLL) of the receiver, the DLL being made up of the correlator 13, the pn code generator 14, the loop filter 15, and the VCO 16.

In the DLL of the receiver shown in FIG. 5, a second pn code sequence is generated by the pn code generator 14 in synchronism with the received transmit signal. The pn code signal of the pn code generator 14 is multiplied with the transmit signal at the correlator 13, and a demodulated signal is produced at the output of the loop filter 15. The VCO 16 is controlled by the output of the loop filter 15 so that a reference clock is output by the VCO 16 to the pn code generator 14 so as to generate the pn code signal in synchronism with the received transmit signal.

On the other hand, the pn period detector 14a detects completion of one period of the pn code signal generated by the pn code generator 14, and it outputs a detect signal to the 1/N divider 14b. Because the received transmit signal is synchronized with a multiple N of one period of the pn code signal at the transmitter, one period of the pn code signal of the pn code generator 14 is divided at the 1/N divider 14b into an N period, so that the signal with the N period is output to the discriminator 18 in synchronism with the received transmit signal.

The waveform shaper 17 converts the demodulated data signal at the output of the loop filter 15 of the DLL with a small amplitude into a demodulated data signal with a large amplitude. The waveform shaper 17 includes a low pass filter with a cutoff frequency dependent on the data rate, the low pass filter serving to remove noises from the output of the loop filter 15. The discriminator 18 detects whether each bit of the demodulated signal from the waveform shaper 17 is equal to the high value "1" or the low value "0" in accordance with the output signal of the 1/N divider 14b to reproduce the data corresponding to the data signal.

Figure 6:
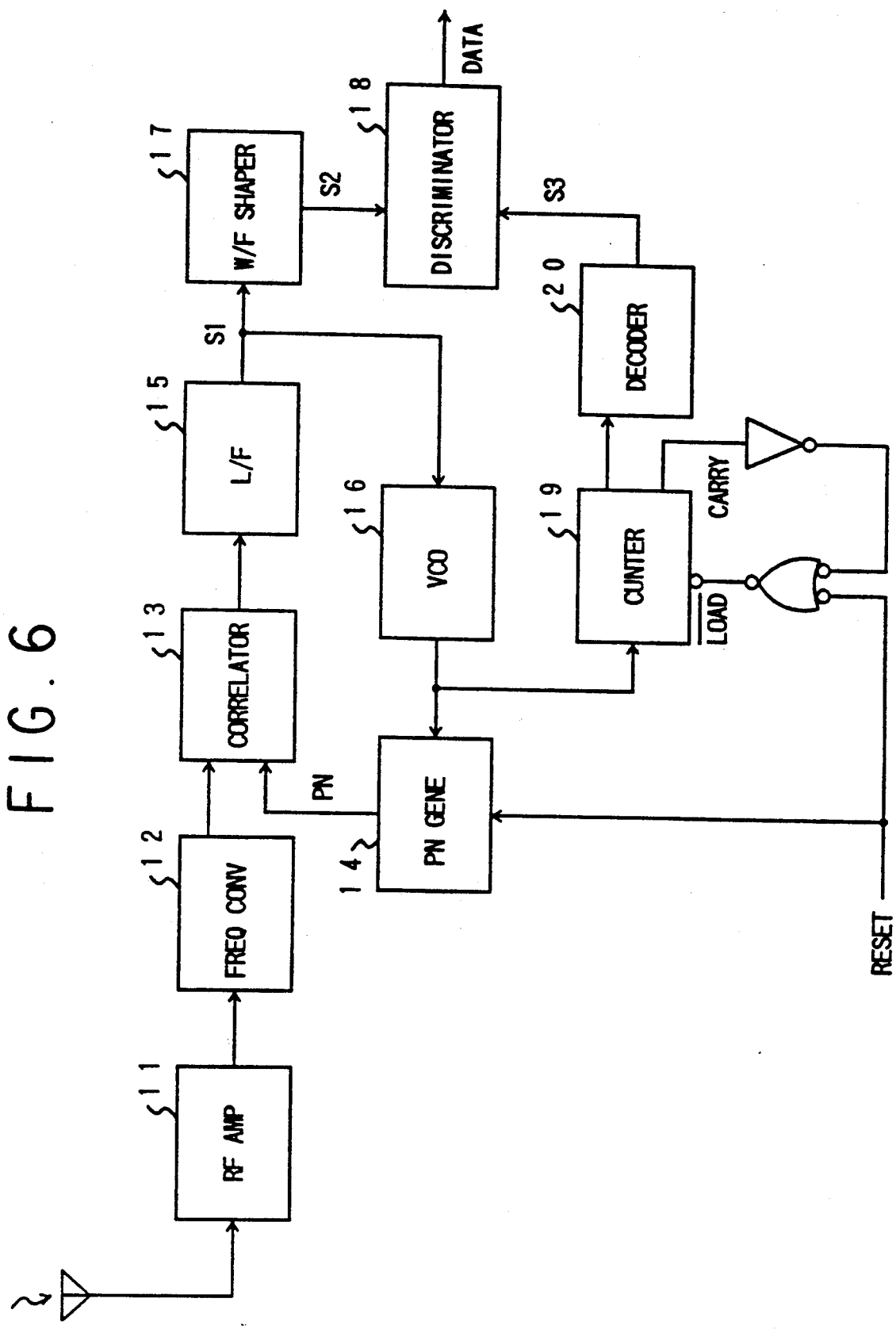
FIG. 6 is a block diagram showing a variation of the receiver shown in FIG. 5.

FIG. 6 shows a variation of the receiver of the SS communication system shown in FIG. 5 according to the present invention. In FIG. 6, the parts which are the same as corresponding parts shown in FIG. 5 are designated by the same reference numerals, and a description thereof will be omitted. In the receiver of FIG. 6, a counter 19 and a decoder 20 are provided in lieu of the pn period detector 14a and the 1/N divider 14b shown in FIG. 5.

In the receiver shown in FIG. 6, a reset signal is input to the pn code generator 14 to start generating the pn code signal before the reception of the transmit signal is accomplished at the receiver. The reset signal is also input to the counter 19 so that the counter 19 starts counting D bits of the pn code signal corresponding to one period of the modulating data signal. The pn code generator 14 is clocked by the reference clock of the VCO 16, and periodically generates the pn code sequence in synchronism with the output signal of the VCO 16, the pn code signal having a period L corresponding to one period of the second pn code sequence. The counter 19 is preset such that a carry signal is output when the counter 19 counts D (=LN) bits of the pn code signal corresponding to one period of the data signal, and such that an inverted signal of the carry signal at the counter 19 is used to restart the counting of the bits of the pn code signal. A detect signal is output to the decoder 20 when D bits of the pn code signal corresponding to one bit of the data signal are counted at the counter 19.

In accordance with the detect signal from the counter 19, the decoder 20 outputs a timing signal S3 to the discriminator 18. This timing signal S3 has a leading edge corresponding to the start of one period of the modulating data signal. The demodulated signal S2 at the output of the waveform shaper 17 has a delay relative to the start of one period of the modulating data signal because the demodulated signal is passed through the DLL and the waveform shaper 17. By taking into consideration this delay, the decoder 20 is preset such that the discriminator 18 discriminates each bit of the demodulated signal S2 at the timing corresponding to the center of one bit of the modulating data signal in accordance with a leading edge of the signal S3 of the decoder 20.

Figure 7:
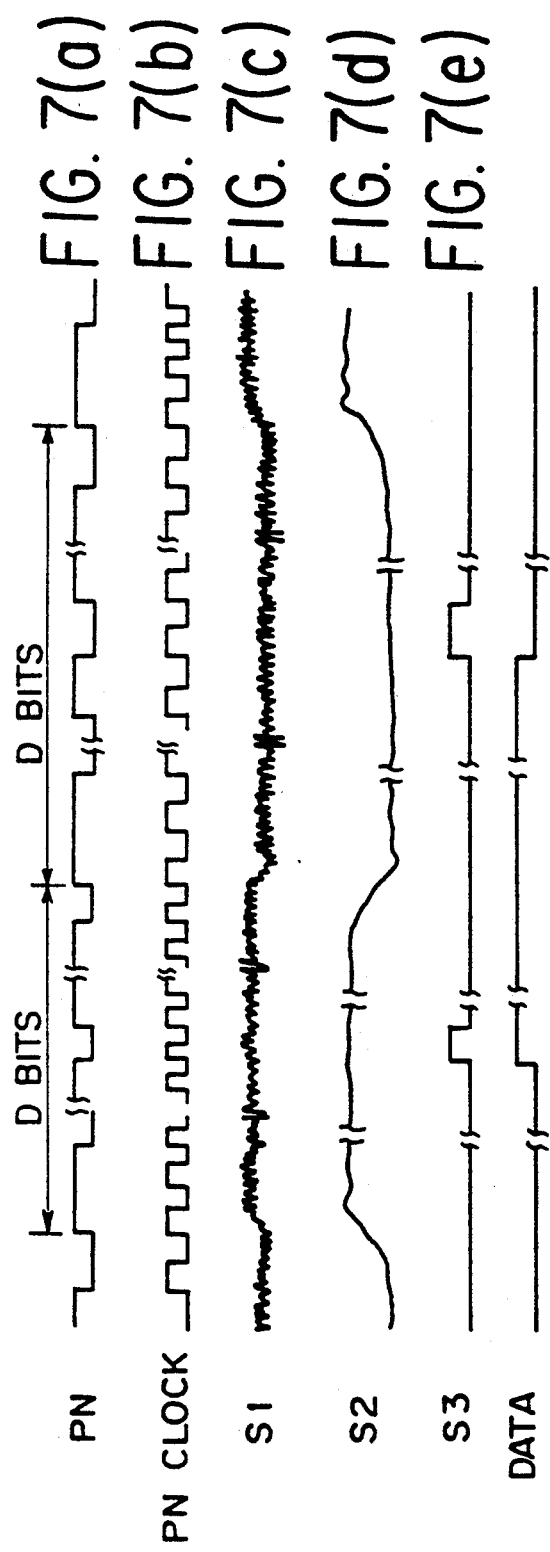
FIG. 7(a) through (f) is a diagram for explaining a set of signals produced at some parts of the receiver shown in FIG. 6

FIG. 7(a) through (f) show a set of signals produced at some parts of the receiver shown in FIG. 6, as described above. FIG. 7(a) shows the pn code signal at the output of the pn code generator 14. FIG. 7(b) shows the pn code clock at the output of the VCO 16. FIG. 7(c) shows the demodulated signal S1 at the output of the loop filter 15. FIG. 7(d) shows the signal S2 at the output of the waveform shaper 17. FIG. 7(e) shows the signal S3 at the output of the decoder 20. FIG. 7(f) shows the reproduced data signal at the output of the discriminator 18.

Figure 8:
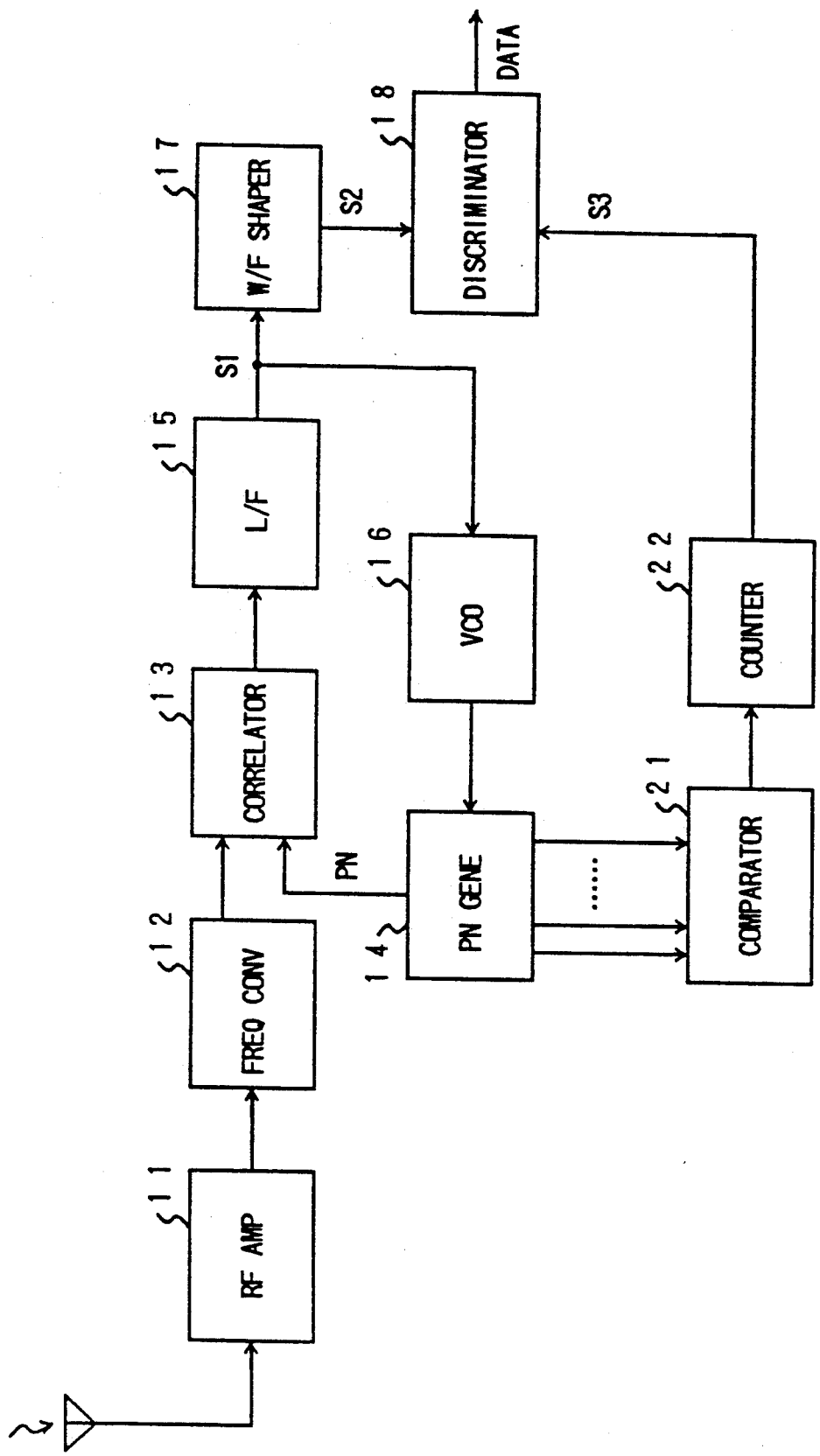
FIG. 8 is a block diagram showing another variation of the receiver shown in FIG. 5.

FIG. 8 shows another variation of the receiver of the SS communication system of the present invention. In FIG. 8, the parts which are the same as corresponding parts of the receiver shown in FIG. 6 are designated by the same reference numerals, and a description thereof will be omitted. In the receiver shown in FIG. 8, a comparator 21 and a counter 22 are provided in lieu of the counter 19 and the decoder 20 shown in FIG. 6.

At the pn code generator 14 of the receiver shown in FIG. 8, the M sequence (maximal-length linear shift register sequence) is used as the pn code sequence. In this example, one period of the modulating data signal is equal to a multiple N of one period of the M sequence signal. The pn code generator 14 includes a shift register, and the comparator 21 includes reference values of a prescribed bit pattern. The signal of the M sequence whose initial values are defined by the prescribed bit pattern of the comparator 21, is periodically generated by the pn code generator 14. At the comparator 21, the bits of the pn code signal are compared with the reference values of the comparator 21, and a detect signal indicating one period of the pn code signal is output to the counter 22. The counter 22 outputs a timing signal S3 to the discriminator 18 when a number "N" of receptions of the detect signals is reached at the counter 22. By selecting appropriate reference values of the comparator 21, it is possible to output the timing signal S3 to the discriminator 18 at a timing corresponding to the center of one bit of the modulating data signal. If one period of the pn code signal of the pn code generator 14 is equal to one period of the modulating data signal (N=1), no counter shown in FIG. 8 is needed in the receiver.

Figure 9:
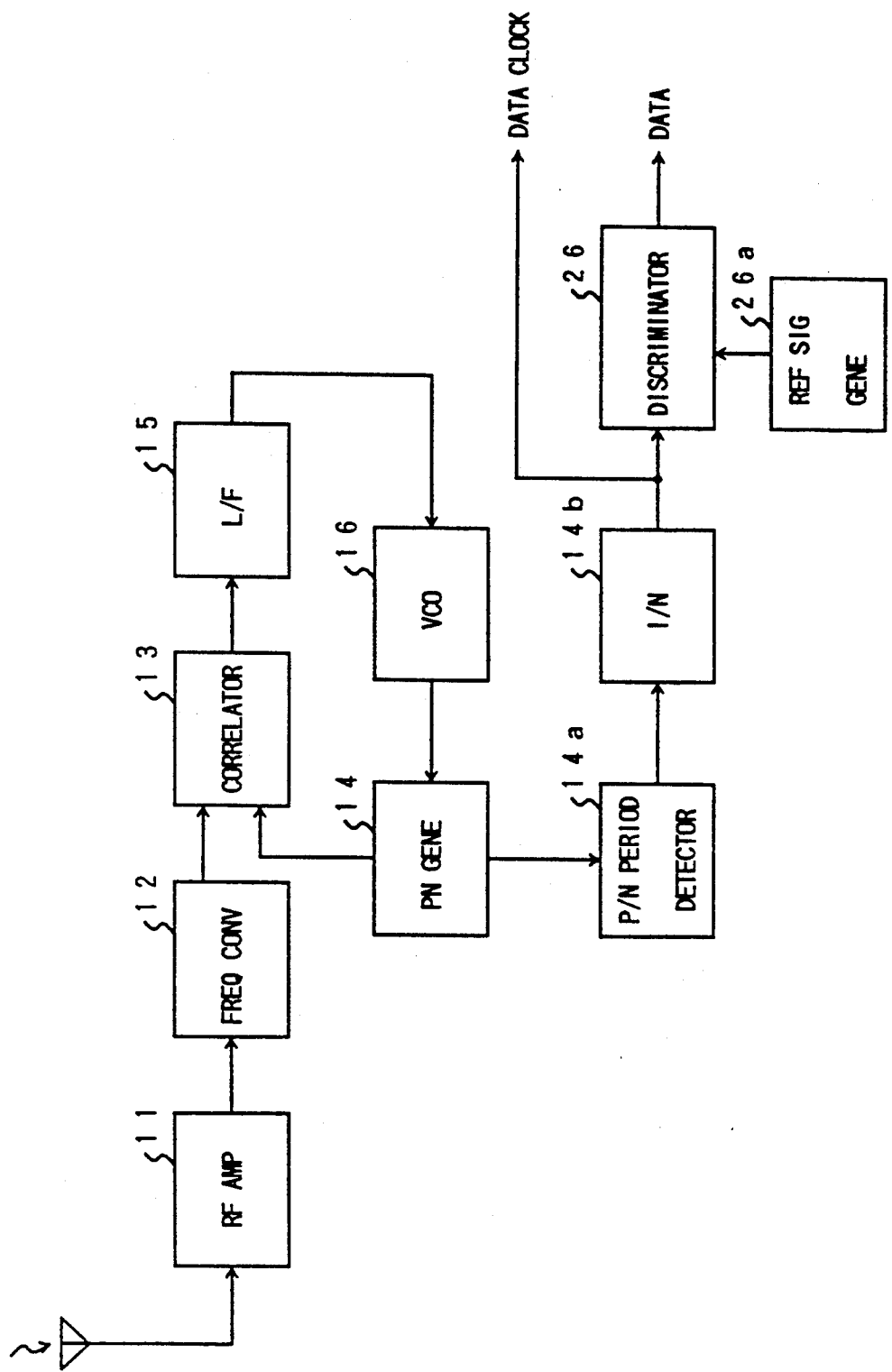
FIG. 9 is a block diagram showing still another variation of the receiver shown in FIG. 5.

FIG. 9 shows another variation of the receiver shown in FIG. 5 according to the present invention. In FIG. 9, the parts which are the same as corresponding parts shown in FIG. 5 are designated by the same reference numerals, and a description thereof will be omitted. In the receiver shown in FIG. 9, a timing discriminator 26 and a reference signal generator 26a are provided.

The reference signal generator 26a sends a timing signal to the timing discriminator 26, this timing signal indicating a timing corresponding to a start of one bit of the modulating data signal relative to the central frequency of the pn code clock at the transmitter. The output signal of the 1/N divider 14b indicates a time duration corresponding to one bit of the data signal. The pn code clock used to generate the pn signal is frequency modulated at the transmitter, and the period corresponding to one bit of the modulating data signal varies in accordance with the modulating data signal. The timing discriminator 26 detects whether the output signal of the 1/N divider 14b has an advance or a delay relative to the reference timing signal of the reference signal generator 26a. Thus, the timing discriminator 26 can detect whether each bit of the received data signal is equal to the high value "1" or the low value "0" in accordance with the output signal of the 1/N divider 14b to reproduce the data corresponding to the modulating data signal.

Figure 10:
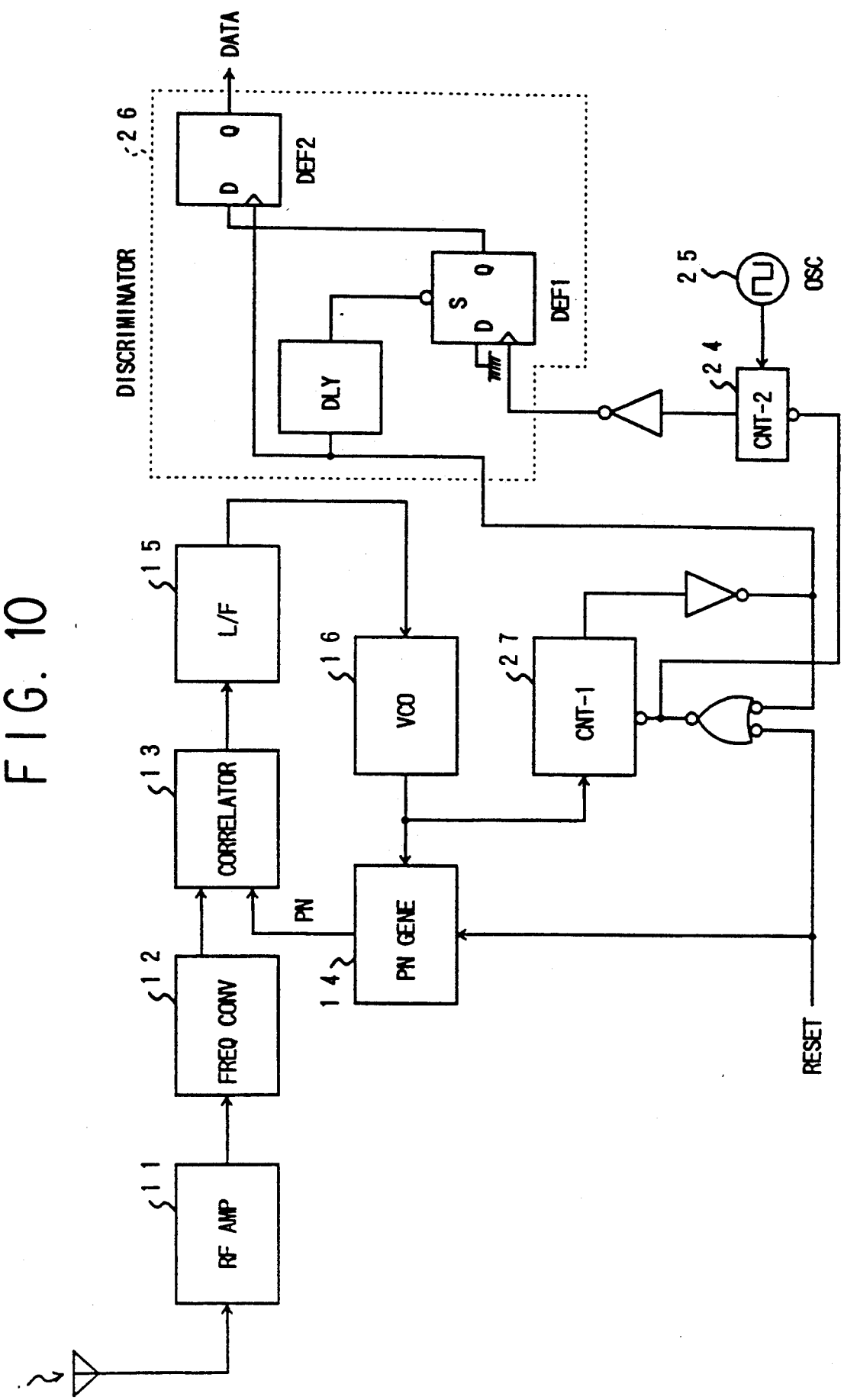
FIG. 10 is a block diagram showing a further variation of the receiver shown in FIG. 9.

FIG. 10 shows a further variation of the receiver shown in FIG. 9 according to the present invention. In FIG. 10, the parts which are the same as corresponding parts shown in FIG. 9 are designated by the same reference numerals, and a description thereof will be omitted. In the receiver shown in FIG. 10, a first counter 27, a second counter 24, an oscillator 25, and the timing discriminator 26 are provided.

In the receiver shown in FIG. 10, a reset signal is input to the pn code generator 14 so as to start generating the pn code sequence before the transmitted signal is received at the receiver. The reset signal is also input to the first counter 27 to start the counting of the bits of the pn code signal generated by the pn code generator 14, and at the same time the second counter 24 starts the counting. The pn code generator 14 is clocked by the pn code clock of the VCO 16, so that the pn code generator 14 outputs the pn code signal of the second pn code sequence having a period L corresponding to one period of the second pn code sequence. The first counter 27 is so constructed that the first counter 27 outputs a carry signal each time it counts D (=LN) bits of the pn code signal corresponding to one period of the transmitted data signal, and that the signal of the counter 27 is supplied by using an inverted signal amplitude of the carry signal each time the counting of D bits of the pn code signal is performed. The first counter 27 repeatedly performs the counting of the bits of the pn code signal.

The second counter 24 is so constructed that the second counter 24 outputs a carry signal each time it counts M bits of a reference clock generated by the oscillator 25, and that the signal of the counter 24 is output by using an inverted signal amplitude of the carry signal each time the M bits of the clock are counted. The second counter 24 repeatedly performs the counting of the bits of the reference clock of the oscillator 25.

The frequency of the reference clock of the oscillator 25 is set to the central frequency of the pn code clock of the VCO 16 or a multiple of the central frequency thereof. A time duration between the output signals of the second counter 24 indicates one period of the pn code signal when the pn code clock has the central frequency. If the frequency of the output signal of the oscillator 25 is equal to the central frequency of the pn code clock, the number "M" of bits of the reference clock counted by the second counter 24 is equal to the number "D" of bits of the pn code signal counted by the first counter 27. If the frequency of the output signal of the oscillator 25 is equal to a multiple "A" of the central frequency of the pn code clock, M=AD. In this example, the receiver is set up so as to be M=2D. The output signal of the first counter 27 is not synchronized with the output signal of the second counter 24. Thus, a higher frequency of the reference clock of the oscillator 25 of which the second counter 24 performs the counting of the bits would make an error of time measurement performed by the counting of the bits of the pn code clock by the first counter 27.

An inverted signal of the carry signal from the first counter 27 and an inverted signal of the carry signal from the second counter 24 are input to the timing discriminator 26. The leading edge of an inverted carry signal CNT-1 of the first counter 27 corresponds to the start of one period of D bits of the pn code clock equivalent to a time duration of one bit of the modulating data signal. For the sake of convenience, it is assumed that the pn code clock is frequency-modulated at the transmitter in accordance with the transmitted data so as to have a frequency higher than the central frequency when a bit of the modulating data signal indicates the high value "1" and have a frequency lower than the central frequency when a bit of the modulating data signal indicates the low value "0". Thus, at the timing discriminator 26 of the receiver, if the pn code signal at the output of the VCO 16 has a delay relative to the timing of a leading edge of an inverted carry signal CNT-2 of the second counter 24, the data corresponding to the modulating data has the low value "0". If the pn code clock has an advance relative to the timing of a leading edge of an inverted carry signal CNT-2 of the second counter 24, the data corresponding to the modulating data has the high value "1". The data corresponding to the transmitted signal is thus reproduced at the timing discriminator 26 of the receiver.

When the timing of a leading edge of an inverted carry signal CNT-1 of the first counter 27 occurs earlier than the timing of a leading edge of an inverted carry signal CNT-2 of the second counter 24, the first counter 27 starts the counting before a carry signal is output by the second counter 24, and no carry signal is output by the first counter 27. In this case, no leading edge of the inverted carry signal CNT-1 of the first counter 27 is detected, and only the leading edge of the inverted carry signal CNT-2 of the second counter 24 is detected by the timing discriminator 26.

The timing discriminator 26 of this embodiment, shown in FIG. 10, is made up of two D flip-flops DFF1 and DFF2 and a delay circuit DLY. When an inverted carry signal of the first counter 27 is input to the delay circuit DLY of the discriminator 26, the delay circuit DLY outputs a delay signal with a delay corresponding to one or more bits of the modulating data. The flip-flop DFF1 is set to the low state when the delay signal of the delay circuit DLY is received. If the modulating data has a bit with the low value "0", the flip-flop DFF1 outputs a signal indicating the low value "0" at the timing of the leading edge of the inverted carry signal of the second counter 24. If the modulating data has a bit with the high value "1", the flip-flop DFF1 outputs a signal indicating the high value "1" and no carry signal appears at the output of the second counter 24. At the flip-flop DFF2, the output signal of the flip-flop DFF1 is checked at the timing of the leading edge of the inverted carry signal of the first counter 27. The data corresponding to the transmitted data is thus reproduced at the timing discriminator 26.

Figure 11:
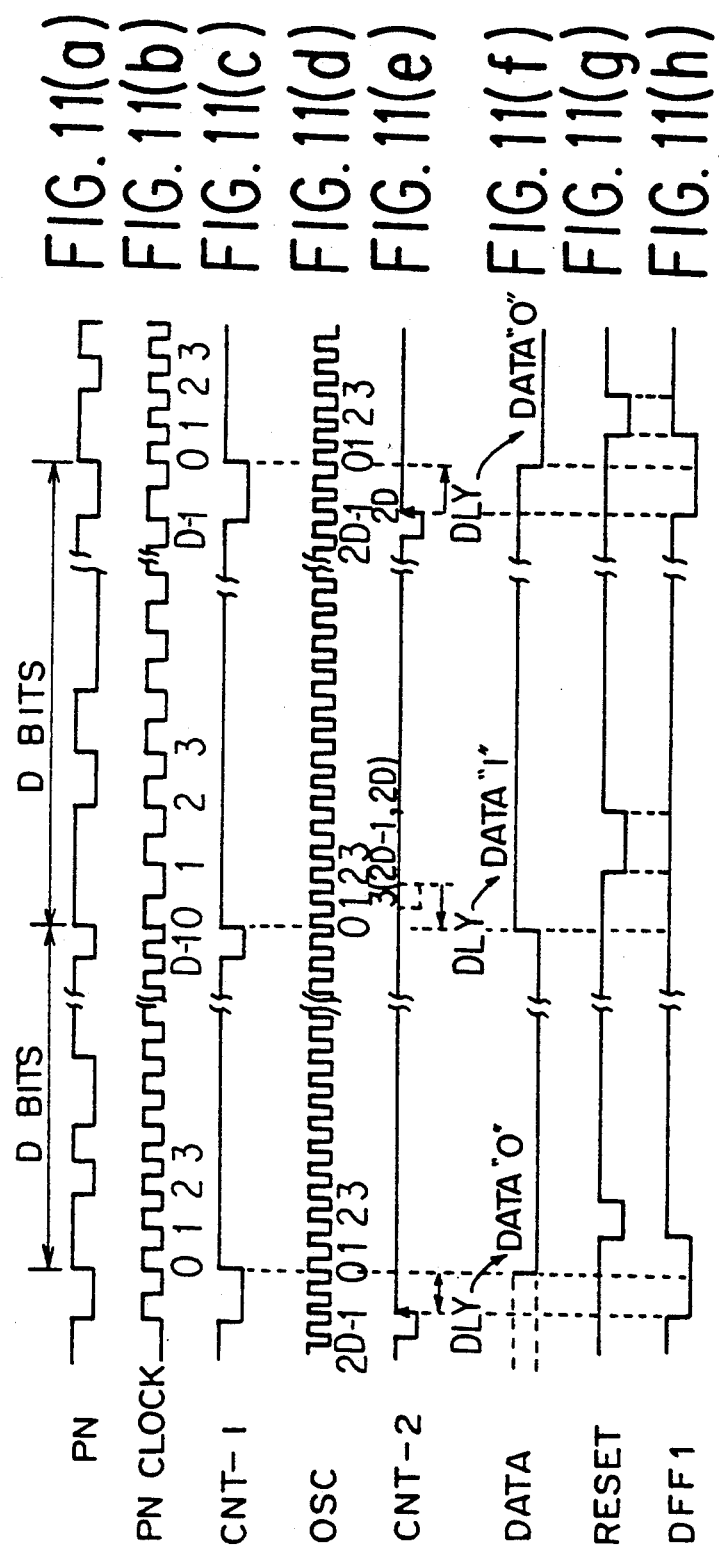
FIG. 11(a) through (h) is a diagram for explaining a set of signals produced at some parts of the receiver shown in FIG. 10.

FIG. 11(a) through (h) show a set of signals produced at several parts of the receiver shown in FIG. 10. FIG. 11(a) shows the pn code signal at the output of the pn code generator 14. FIG. 11(b) shows the pn code clock at the output of the VCO 16. FIG. 11(c) shows the output signal of the first counter 27. FIG. 11(d) shows the output signal of the oscillator 25. FIG. 11(e) shows the output signal of the second counter 24. FIG. 11(f) shows the data signal at the output of the discriminator 26. FIG. 11(g) shows the reset signal input to the pn code generator 14. FIG. 11(h) shows the output signal of the D flip flop DFF1.

Figure 12:
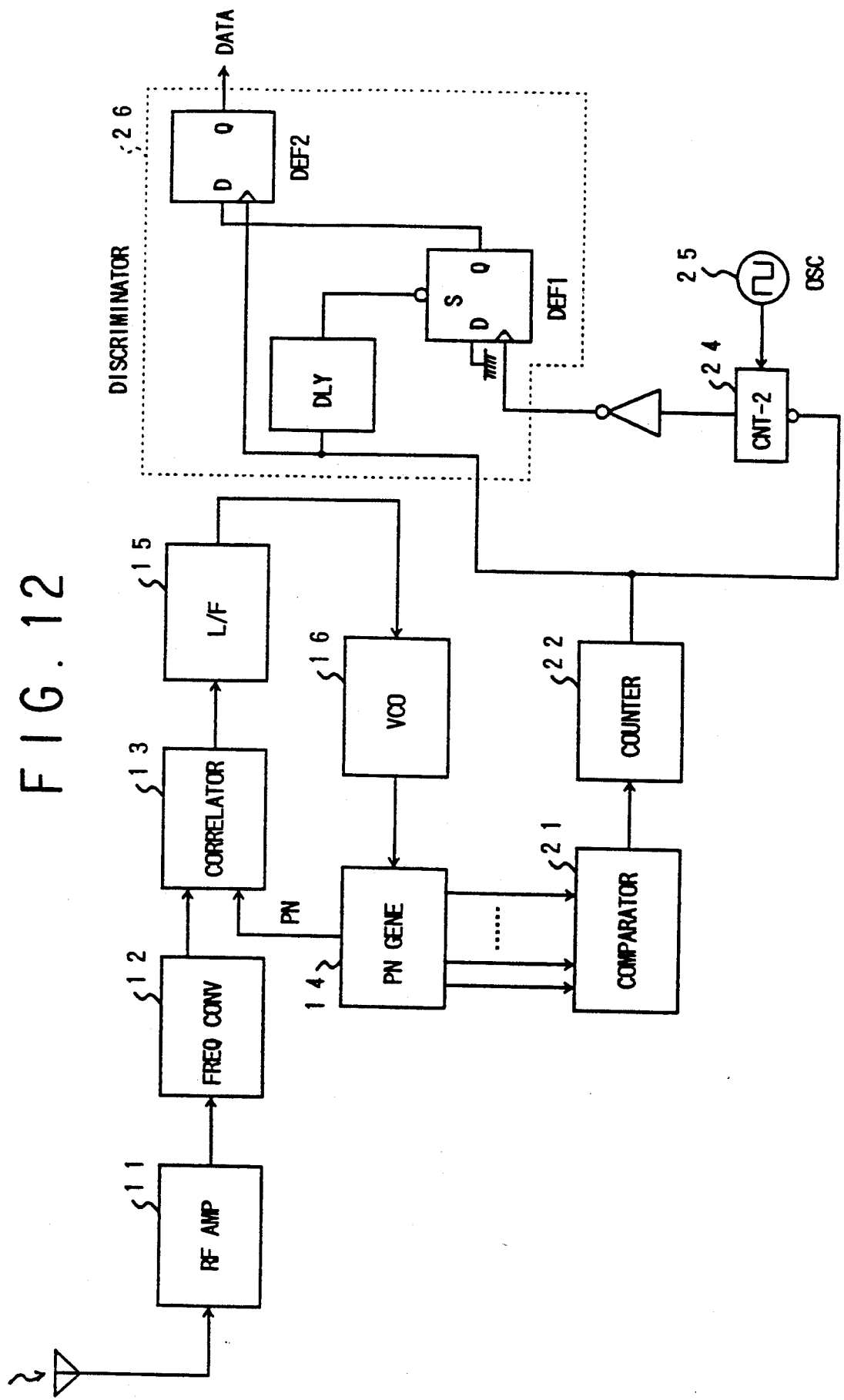
FIGS. 12 through 14 are block diagrams showing further variations of the receivers for use in the SS communication system of the present invention.

FIG. 12 shows a further variation of the receiver shown in FIG. 10 according to the present invention. In FIG. 12, the parts which are the same as corresponding parts shown in FIG. 10 are designated by the same reference numerals, and a description thereof will be omitted. In the receiver shown in FIG. 12, the comparator 21 and the counter 22 as shown in FIG. 8 are provided.

At the pn code generator 14 of the receiver shown in FIG. 12, the M sequence is used as the pn code sequence. In this example, one period of the modulating data signal is a multiple N of one period of the pn code signal. The pn code generator 14 includes a shift register, and the comparator 21 includes reference values formed of a prescribed bit pattern. The pn code signal of the maximal-length linear shift register sequence is periodically generated by the pn code generator 14. At the comparator 21, the bits of the pn code signal are compared with the reference values of the comparator 21, and a detect signal indicating one period of the pn code signal is output to the counter 22. Thus, the function which is the same as that of the first counter 27 to output the carry signal as shown in FIG. 10 can be accomplished. The counter 22 outputs a timing signal S3 to the discriminator 26 when the number "N" of receptions of the detect signal is reached at the counter 22. By selecting appropriate reference values of the reference bits of the comparator 21, it is possible to output the timing signal S3 to the discriminator 26 at a timing corresponding to the center of one bit of the modulating data signal. If one period of the pn code signal of the pn code generator 14 is equal to one period of the modulating data signal (N=1), no counter as shown in FIG. 12 is needed in the receiver.

Figure 13:
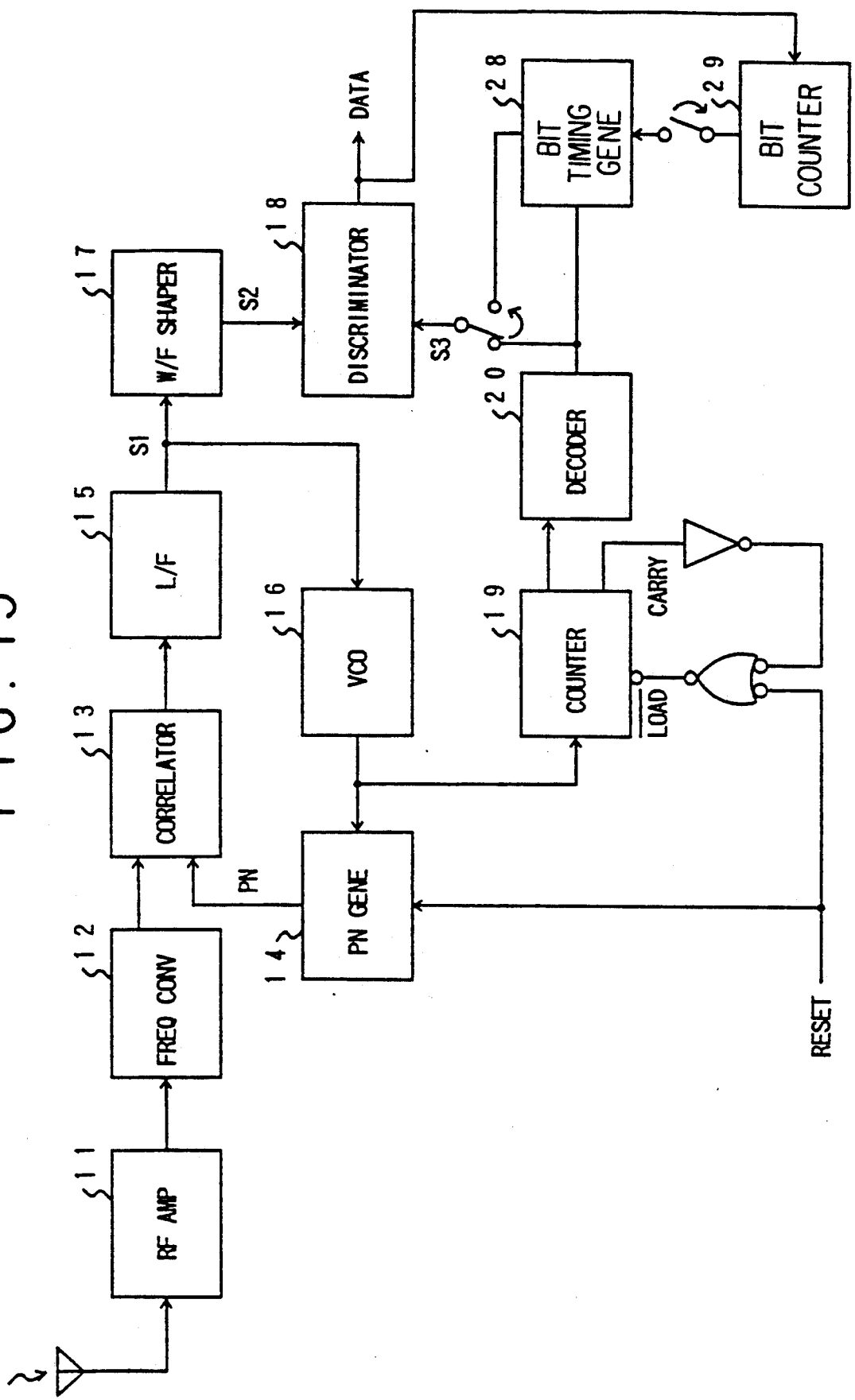

FIG. 13 shows a further variation of the receiver shown in FIG. 6 according to the present invention. In FIG. 13, the parts which are the same as corresponding parts shown in FIG. 6 are designated by the same reference numerals, and a description thereof will be omitted. In the receiver shown in FIG. 13, a bit timing generator 28 and a bit counter 29 are provided additionally.

The counter 19 shown in FIG. 13 is preset such that a carry signal is output each time the counter 19 counts D (=LN) bits of the pn code signal corresponding to one period of the modulating data signal, and that an inverted signal of the carry signal at the counter 19 is used as the signal to restart the counting of the bits of the pn code signal. A detect signal is output to the decoder 20 when D bits of the pn code signal corresponding to one period of the data signal are counted at the counter 19. One period of the modulating data signal is equal to a multiple N of one period of the pn code signal generated by the pn code generator 14.

In accordance with the detect signal from the counter 19, the decoder 20 outputs a timing signal S3 to the discriminator 18. This timing signal S3 has a leading edge corresponding to the timing of a start of one period of the modulating data signal. By taking into consideration the delay of the signal S2, the decoder 20 is preset such that the discriminator 18 checks each bit of the signal S2 at the timing corresponding to the center of one bit of the signal S2 in accordance with the leading edge of the signal S3 of the decoder 20.

Generally, a preamble having repeated sequences of either of the values "1" and "0" is received at the receiver prior to the reception of the transmitted signal for the purpose of accomplishing the bit synchronization when the data corresponding to the modulating data signal is reproduced. During the reception of the preamble at the receiver, the bit timing generator 28 supplies the output signal of the decoder 20 to the discriminator 18 at the timing corresponding to the start of one period of the pn code signal. During this period, at the bit counter 29, a number N of receptions of the value "1" or "0" of the preamble detected by the discriminator 18 is counted at the bit counter 29 so that a separator of the transmitted data signal can be correctly detected, and the bit synchronization is accomplished. After the bit synchronization is performed, the bit timing generator 28 supplies only the (M+1)-th output signal of the decoder 20 to the discriminator 18 when the counted number N of the bit counter 29 is an odd number ($N=2M+1$, $M \geq 1$).

Figure 15:
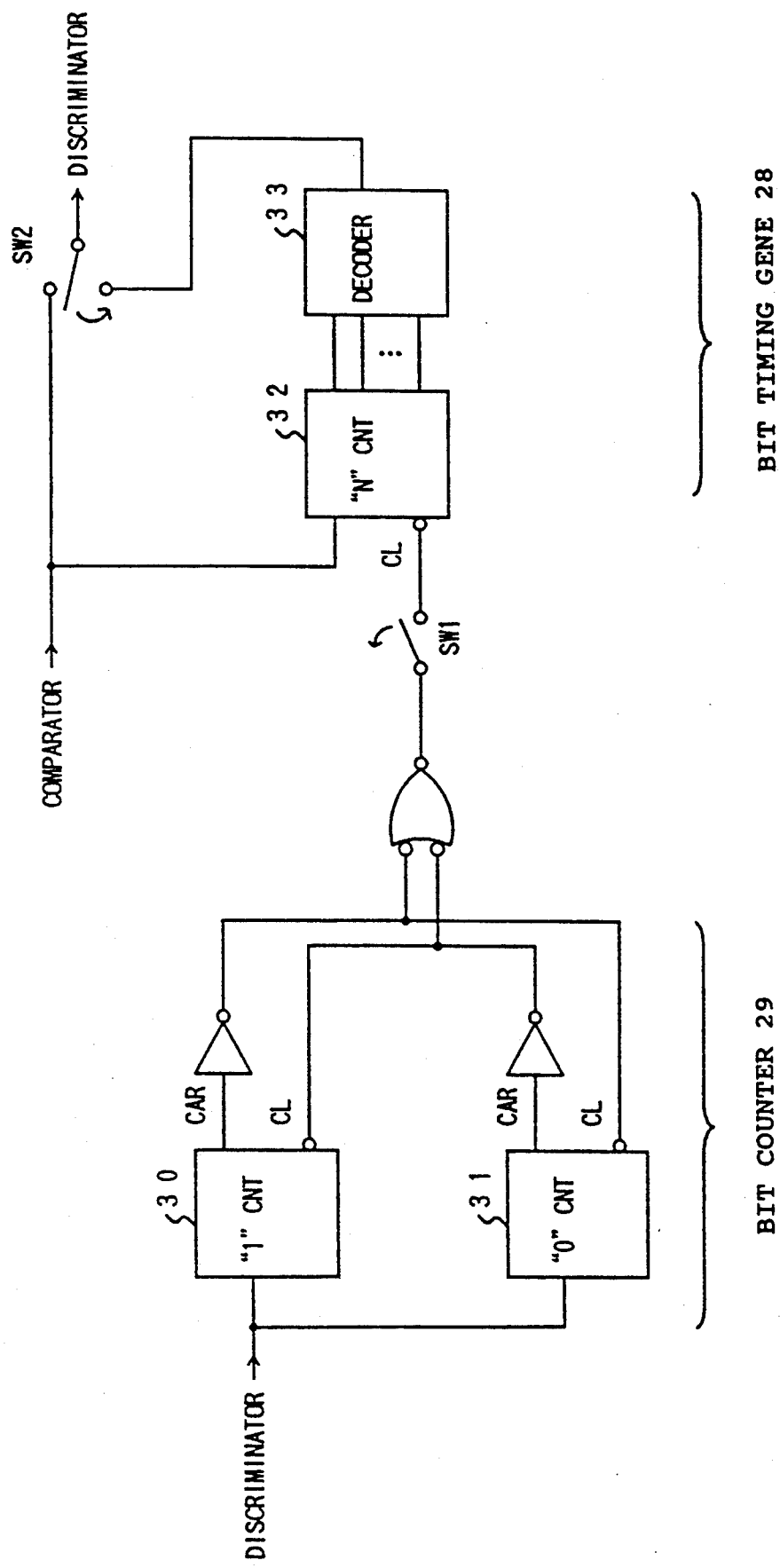
FIG. 15 is a block diagram showing a reference signal generator and a bit synchronizer used in the receiver shown in FIG. 13 or FIG. 14 according to the present invention.

FIG. 15 shows an example of the bit timing generator 28 provided with the bit counter 29 used in the receiver shown in FIG. 13. The bit counter 29 includes a value "1" counter 20 and a value "0" counter 31. The bit timing generator 28 includes an "N" counter 32 and a decoder 33. When the preamble is received at the receiver prior to the reception of the transmitted signal, a first switch SW1 and a second switch SW2 are turned ON so that the bit counter 29 is connected to the bit timing generator 28 and the generator 28 is connected to the discriminator 18. Each data corresponding to the preamble detected by the discriminator 18 is selectively supplied to the value "1" counter 30 or to the value "0" counter 31. When the number N of receptions of the value "1" or "0" of the preamble is counted, a carry signal is output from either of the two counters 30, 31. One of the two counters 30 and 31 is then cleared, and at the same time the "N" counter 32 is cleared. After the bit synchronization is accomplished by means of these parts 28 and 29, the two switches SW1 and SW2 are turned OFF so that the decoder 20 is connected to the discriminator 18. By means of the decoder 33, the bit timing generator 28 supplies only the (M+1)-th output signal of the decoder 20 to the discriminator 18 if the counted number N of the bit synchronizer 29 is an odd number ($N=2M+1$, $M \geq 1$).

The demodulated signal S2 at the output of the waveform shaper 17 has a delay relative to the timing corresponding to the start of one period of the modulating data signal because the demodulated signal is passed through the DLL and the waveform shaper 17. The setting of the decoder 20 is performed by considering this delay of the signal S2. The decoder 20 is preset so as to enable the discriminator 18 to detect each bit of the demodulated signal S2 at the timing corresponding to the center of one bit of the signal S2 in accordance with the leading edge of the signal S3 of the decoder 20. Thus, it is possible to efficiently and reliably perform the data discrimination with no demodulating errors being produced.

Figure 16:
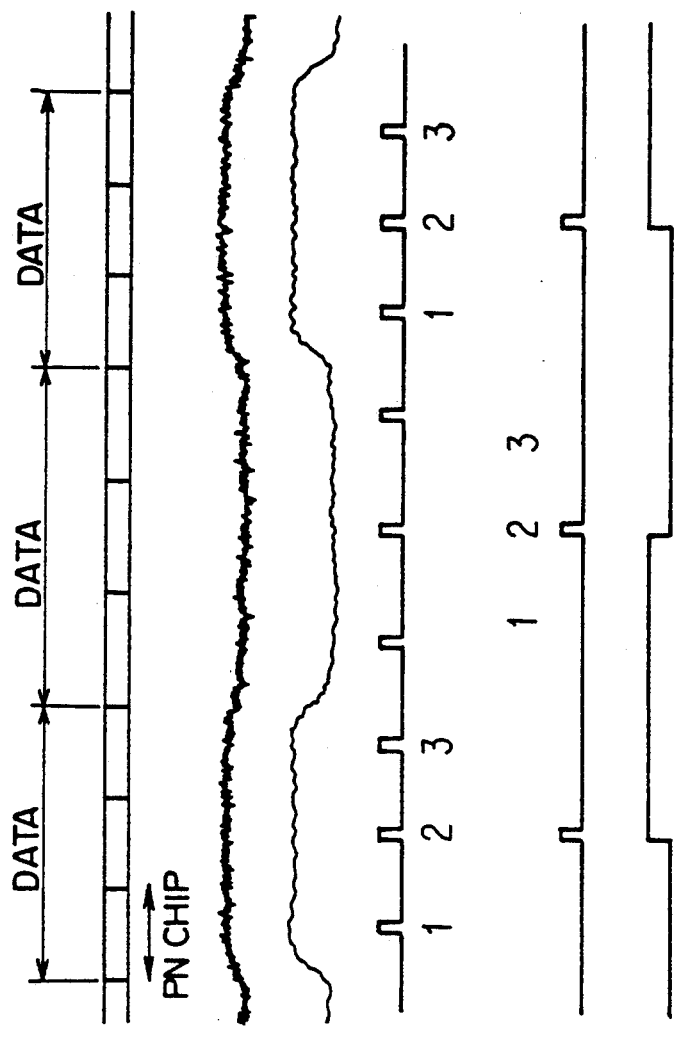
FIG. 16(a) through (f) is a diagram for explaining a set of signals produced at some parts of the receiver shown in FIG. 13 or FIG. 14.

FIG. 16(a) through (f) show a set of signals produced at some parts of the receiver shown in FIG. 13. FIG. 16(d) shows the respective output signals of the value "1" counter and the value counter used in the bit synchronizer 29.

Figure 14:
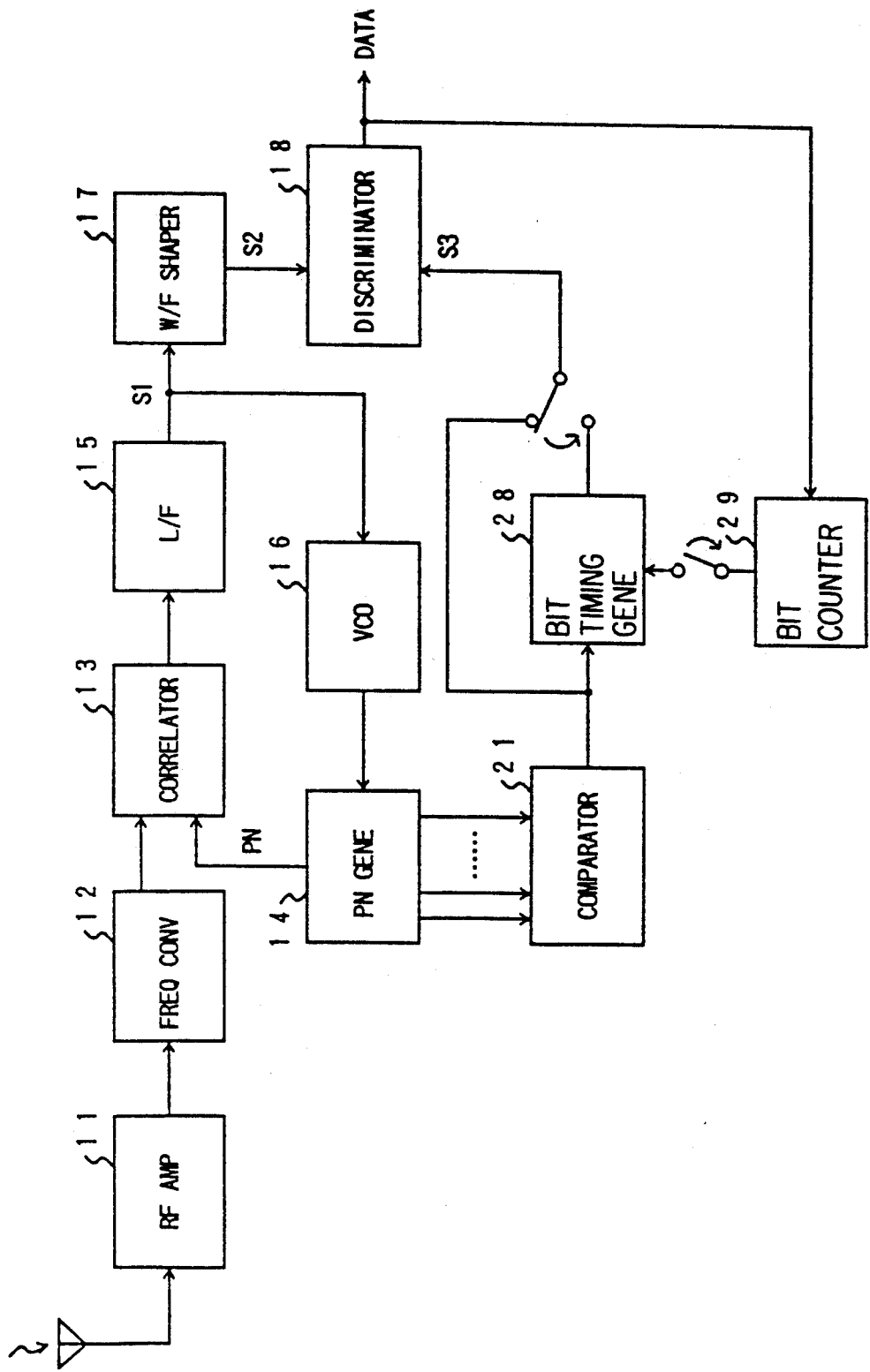

FIG. 14 shows a further variation of the receiver of the SS communication system shown in FIG. 13. This receiver, shown in FIG. 14, is constructed for the use when the shift register of the pn code generator 14 generates the pn code signal of the maximal-length linear shift-register pn code sequence, and the pn code signal has a period being 1/N of one period of the modulating data signal. In the receiver of FIG. 14, the comparator 21 is provided in lieu of the counter 19 and the decoder 20 shown in FIG. 13, and the bit timing generator 28 and the bit synchronizer 29 are also provided. At the comparator 21, the bits of the pn code generator 14 are compared with the prescribed reference bits of the comparator 21, and the timing signal S3 is supplied to the discriminator 18, which is the same as that of the decoder 20 of FIG. 13 as described above. The bit timing generator 28 and the bit synchronizer 29 shown in FIG. 14 are the same as those shown in FIG. 15. In FIG. 14, the other parts which are the same as corresponding parts shown in FIG. 13 are designated by the same reference numerals, and a description thereof will be omitted.

Figure 17:
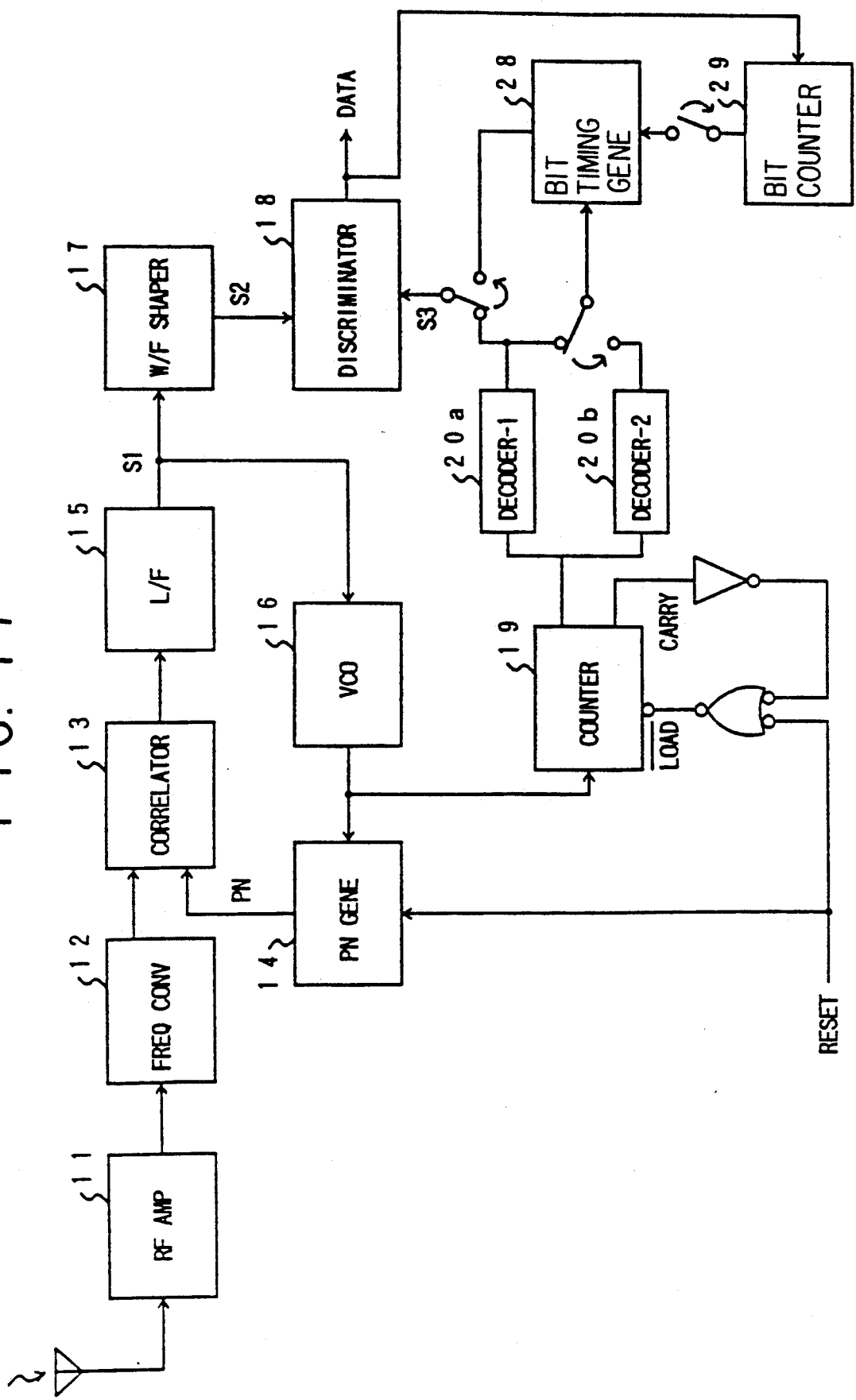
FIGS. 17 and 18 are block diagrams showing further variations of the receivers for use in the SS communication system of the present invention.

FIG. 17 shows a further variation of the receiver of the SS communication system shown in FIG. 13. In the receiver shown in FIG. 17, two decoders 20a and 20b are provided in lieu of the decoder 20 shown in FIG. 13. The first decoder 20a of FIG. 17 is the same as the decoder 20 of FIG. 13 as described above, and this first decoder 20a is connected to the bit timing generator 28 and the discriminator 18 when the preamble of the transmitted signal is received and the bit synchronization is carried out. The output signal of the first decoder 20a is used to detect the separator of the transmitted data signal. After the above mentioned bit synchronization is performed, the second decoder 20b is connected to the bit timing generator 28. The second decoder 20b is preset so as to make it possible for the discriminator 18 to detect each bit of the demodulated signal S2 at the timing corresponding to the center of one bit of the signal S2 in accordance with the leading edge of the timing other parts which are the same as corresponding parts shown in FIG. 13 are designated by the same reference numerals, and a description thereof will be omitted.

FIG. 19(a) through (f) show a set of signals produced at some parts of the receiver shown in FIG. 17. FIG. 19(d) shows the respective output signals of the value "1" counter and the value counter used in the bit synchronizer 29.

Figure 18:
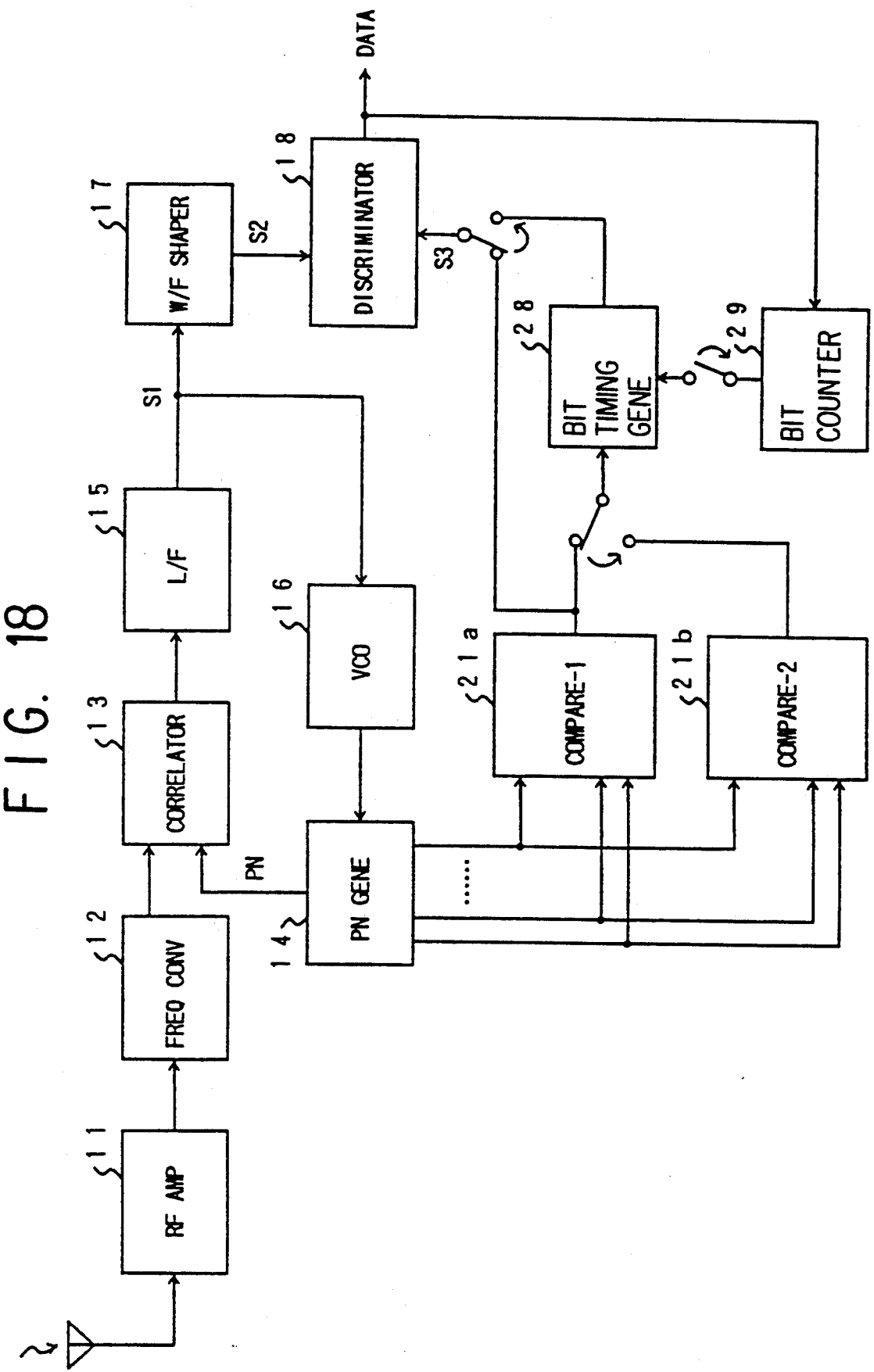

FIG. 18 shows a further variation of the receiver shown in FIG. 14. In the receiver shown in FIG. 18, two comparators 21a and 21b are provided in lieu of the comparator 21 shown in FIG. 14. The first comparator 21a of FIG. 18 is the same as the comparator 21 of FIG. 14 as described above. This first comparator 21a is connected to the bit timing generator 28 and the discriminator 18 when the preamble of the transmitted data signal is received and the bit synchronization is carried out. The output signal of the first comparator 21a is used to detect the separator of the transmitted data signal. After the bit synchronization is performed, the second comparator 21b is connected to the bit timing generator 28. The second comparator 21b is present so as to make it possible that the discriminator 18 detects each bit of the demodulated signal S2 at the timing corresponding to the center of one bit of the data signal according to the leading edge of the timing signal S3 of the second comparator 21b. In FIG. 18, the other parts which are the same as corresponding parts shown in FIG. 14 are designated by the same reference numerals, and a description thereof will be omitted.

Further, the present invention is not limited to the above described embodiments, and variations and modifications may be made without departing from the scope of the present invention.

What is claimed is:

1. A spread spectrum communications system comprising:
   a transmitter including: data generating means for generating a data signal to be transmitted; pn generating means for generating a first pn code sequence in accordance with a pn code clock; modulation means for modulating said pn code clock in accordance with said data signal by synchronizing said data signal with a multiple N of one period of said first pn code sequence; first means for detecting one period of said first pn code sequence generated by said pn generating means; second means for converting said detected period of said first pn code sequence into a period equal to a multiple N of said detected period and for outputting a clock with said N period to said data generating means; and output means for transmitting a signal produced at an output of said pn generating means, and
   a receiver which receives the transmitted signal from the transmitter, said receiver including: second pn generating means for generating a second pn code sequence in synchronism with said transmitted signal; demodulation means for demodulating said transmitted signal with said second pn code sequence generated by said second pn generating means so as to reproduce data corresponding to said data signal; third means for detecting one period of said second pn code sequence; fourth means for converting said detected period of said second pn code sequence into a period equal to a multiple N of said detected period and for outputting a timing signal in accordance with said N period; and discrimination means for detecting whether each bit of a demodulated signal at an output of said demodulation means is equal to a high value "1" or a low value "0" in synchronism with said timing signal of said fourth means.

2. A spread spectrum communication system according to claim 1, wherein said first means and said second means of said transmitter include a counter for counting a prescribed number D of bits of said pn code clock, said number D of the bits corresponding to one period of said data signal generated by said data generating means.

3. A spread spectrum communication system according to claim 1, wherein said pn generating means of said transmitter includes a shift register for generating a plurality of bits of the first pn code sequence at an output of said shift register, said first pn code sequence being formed of a maximal-length linear shift register sequence, and wherein said first means includes a comparator having a plurality of reference bits formed of a prescribed bit pattern, so that the bits of the first pn code sequence of said shift register are compared with the reference bits of said comparator and a detect signal indicating one period of the first pn code sequence is output to said second means.

4. A spread spectrum communication system according to claim 1, wherein said third means and said fourth means of said receiver are made up of a counter and a decoder, said counter counting a prescribed number D of bits of a second pn code clock generated at said receiver in accordance with said transmitted signal, said number D of said bits being equal to a multiple N of the detected period of the second pn code sequence, so that said counter outputs a detect signal to said decoder each time the number D of bits of the second pn code clock is counted, and said decoder outputting a timing signal to said discrimination means at a timing corresponding to the center of each bit of the demodulated signal.

5. A spread spectrum communication system according to claim 1, wherein said second pn generating means of said receiver includes a shift register for generating a plurality of bits of the second pn code sequence at an output of said shift register, said second pn code sequence being formed of a maximal-length linear shift register sequence, and wherein said third means includes a comparator having a plurality of reference bits formed of a prescribed bit pattern, so that the bits of the second pn code sequence of said shift register are compared with the reference bits of said comparator and a detect signal indicating one period of the second pn code sequence is output by said comparator to said fourth means.

6. A spread spectrum communication system according to claim 1, wherein said discrimination means of said receiver is made up of a timing discriminator and a bit timing generator, said bit timing generator generating a bit timing signal at a timing corresponding to a start of each bit of the data signal relative to a central frequency of the first pn code sequence at the transmitter, said timing discriminator being coupled to said fourth means and detecting whether each bit of a signal at an output of said fourth means is equal to the high value "1" or the low value "0" by detecting whether said signal at the output of the fourth means has an advance or delay relative to the bit timing signal of said bit timing generator.

7. A spread spectrum communication system according to claim 6, wherein said third means and said fourth means of said receiver include a counter for counting a prescribed number D of bits of a second pn code clock generated at said receiver in accordance with said transmitted signal, said number D of the bits corresponding to one period of said data signal generated by said data generating means.

8. A spread spectrum communication system according to claim 6, wherein said second pn generating means of said receiver includes a shift register for generating a plurality of bits of the second pn code sequence at an output of said shift register, said second pn code sequence being formed of a maximal-length linear shift register sequence, and wherein said third means includes a comparator having a plurality of reference bits formed of a prescribed bit pattern, so that the bits of the second pn code sequence of said shift register are compared with the reference bits of said comparator and a detect signal indicating one period of the second pn code sequence is output by said comparator to said fourth means.

9. A spread spectrum communication system according to claim 1, further comprising a bit timing generator and a bit counter, said bit timing generator being connected to said fourth means when a preamble is received from said transmitter prior to reception of the transmitted signal, and said bit counter being connected to said discrimination means during the receiving of said preamble, wherein said bit counter counts a prescribed number N of receptions of either of values "1" and "0" corresponding to the preamble which values are detected by said discrimination means, so as to detect a separator of the transmitted signal, and wherein said bit timing generator generates a detect signal after said separator of the transmitted signal is detected, and said bit timing generator supplying an output signal of said fourth means to said discrimination means at a timing corresponding to a start of one period of the second pn code sequence, and wherein said bit timing generator supplies only the (M+1)-th output signal of the fourth means to the discrimination means when said number N is an odd number (N=2M+1, M≧1).

10. A spread spectrum communication system according to claim 9, wherein said second pn generating means of said receiver includes a shift register for generating a plurality of bits of the second pn code sequence at an output of said shift register, said second pn code sequence being formed of a maximal-length linear shift register sequence, and wherein said third means includes a comparator having a plurality of reference bits formed of a prescribed bit pattern, so that the bits of the second pn code sequence of said shift register are compared with the reference bits of said comparator and a detect signal indicating one period of the second pn code sequence is output by said comparator to said fourth means.

11. A spread spectrum communication system according to claim 9, wherein, when said number N is an even number, said third means and said fourth means are made up of two decoders so that said timing signal is output by one of the decoders to said discrimination means at a timing corresponding to the center of each bit of the second pn code sequence.

12. A spread spectrum communication system according to claim 10, wherein, when said number N is an even number, said third means and said fourth means are made up of two comparators so that said timing signal is output by one of the comparators to said discrimination means at a timing corresponding to the center of each bit of the second pn code sequence.

* * * * *